(12) United States Patent
Ambrozy et al.

(10) Patent No.: US 9,063,015 B2
(45) Date of Patent: *Jun. 23, 2015

(54) STIMULUS INDICATION EMPLOYING POLYMER GELS

(75) Inventors: Rel S. Ambrozy, Arlington, VA (US); Jade Litcher, Raleigh, NC (US); Raymond C. Jones, Leesburg, VA (US)

(73) Assignee: Prasidiux LLP, Arlington, VA (US)

( * ) Notice: Subject to any disclaimer, the term of this patent is extended or adjusted under 35 U.S.C. 154(b) by 1445 days.

This patent is subject to a terminal disclaimer.

(21) Appl. No.: 11/414,254

(22) Filed: May 1, 2006

(65) Prior Publication Data
US 2006/0262828 A1 Nov. 23, 2006

Related U.S. Application Data

(60) Provisional application No. 60/675,882, filed on Apr. 29, 2005.

(51) Int. Cl.
*G01K 3/04* (2006.01)
*G01K 5/00* (2006.01)

(52) U.S. Cl.
CPC .. *G01K 3/04* (2013.01); *G01K 5/00* (2013.01); *G01K 2207/04* (2013.01)

(58) Field of Classification Search
CPC ................................. G01K 3/04; G01K 5/00
See application file for complete search history.

(56) References Cited

U.S. PATENT DOCUMENTS

| | | | |
|---|---|---|---|
| 2,850,393 A | 9/1958 | Romito | |
| RE25,499 E | 12/1963 | Fenity et al. | |
| 3,615,719 A | 10/1971 | Michel et al. | |
| 3,665,770 A | 5/1972 | Sagi et al. | |
| 3,695,903 A | 10/1972 | Telkes et al. | |
| 3,888,631 A | 6/1975 | Sturzinger | |
| 3,922,917 A | 12/1975 | Ayres | |
| 3,954,011 A | 5/1976 | Manske | |
| 3,962,920 A | 6/1976 | Manske | |
| 3,967,579 A | 7/1976 | Seiter | |
| 3,999,946 A | 12/1976 | Patel et al. | |
| 4,064,827 A | 12/1977 | Darringer et al. | |
| 4,118,370 A | 10/1978 | Sannes et al. | |
| 4,148,748 A | 4/1979 | Hanlon et al. | |
| 4,175,207 A | 11/1979 | Elliott | |
| 4,280,361 A | 7/1981 | Sala | |

(Continued)

FOREIGN PATENT DOCUMENTS

| | | |
|---|---|---|
| GB | 1212859 | 11/1970 |
| GB | 2397022 | 7/2004 |

(Continued)

OTHER PUBLICATIONS

*Vitsab® A Technical Short Course.* Available from website, 1998. Vitsab Indicator marketing information.

(Continued)

*Primary Examiner* — Jonathan Hurst
(74) *Attorney, Agent, or Firm* — Fox Rothschild LLP; Jeff Schwartz

(57) ABSTRACT

Techniques and devices are presented for communicating exposure to a potentially harmful stimulus. The devices include a stimulus sensitive gel which changes volume in response to exposure to the stimulus and thereby presents a contrast in color that serves as a visual indicator that exposure to the stimulus has occurred.

24 Claims, 3 Drawing Sheets

(56) References Cited

U.S. PATENT DOCUMENTS

| | | | |
|---|---|---|---|
| 4,327,117 A | 4/1982 | Lenack et al. |
| 4,390,291 A | 6/1983 | Gaven, Jr. et al. |
| 4,439,346 A | 3/1984 | Patel et al. |
| 4,588,491 A | 5/1986 | Kreisher et al. |
| 4,601,588 A | 7/1986 | Takahara et al. |
| 4,657,409 A | 4/1987 | Wiggin et al. |
| 4,732,930 A | 3/1988 | Tanaka et al. |
| 4,737,463 A | 4/1988 | Bhattacharjee et al. |
| 4,812,053 A | 3/1989 | Bhattacharjee |
| 4,892,677 A | 1/1990 | Preziosi et al. |
| 4,917,503 A | 4/1990 | Bhattacharjee |
| 4,925,314 A | 5/1990 | Claudy et al. |
| 5,000,579 A | 3/1991 | Kumada et al. |
| 5,053,339 A | 10/1991 | Patel |
| 5,057,434 A | 10/1991 | Prusik et al. |
| 5,076,197 A | 12/1991 | Darringer et al. |
| 5,077,033 A | 12/1991 | Viegas et al. |
| 5,085,802 A | 2/1992 | Jalinski |
| 5,100,933 A | 3/1992 | Tanaka et al. |
| 5,153,036 A * | 10/1992 | Sugisawa et al. ............ 428/34.1 |
| 5,198,148 A | 3/1993 | Nakano |
| 5,242,491 A | 9/1993 | Mamada et al. |
| 5,267,794 A | 12/1993 | Holzer |
| 5,274,018 A | 12/1993 | Tanaka et al. |
| 5,281,570 A | 1/1994 | Hasegawa et al. |
| 5,336,057 A | 8/1994 | Fukuda et al. |
| 5,348,813 A | 9/1994 | Bohmer et al. |
| 5,360,682 A | 11/1994 | Bohmer |
| 5,403,893 A | 4/1995 | Tanaka et al. |
| 5,404,834 A | 4/1995 | Murphy |
| RE35,068 E | 10/1995 | Tanaka et al. |
| 5,476,792 A | 12/1995 | Ezrielev et al. |
| 5,580,929 A | 12/1996 | Tanaka et al. |
| 5,602,804 A | 2/1997 | Haas |
| 5,622,137 A | 4/1997 | Lupton, Jr. et al. |
| 5,630,372 A | 5/1997 | Ramsey et al. |
| 5,633,835 A | 5/1997 | Haas et al. |
| 5,667,303 A | 9/1997 | Arens et al. |
| 5,694,806 A | 12/1997 | Martin et al. |
| 5,709,472 A | 1/1998 | Prusik et al. |
| 5,922,186 A | 7/1999 | Shukla et al. |
| 5,964,181 A | 10/1999 | Pereyra et al. |
| 5,997,927 A | 12/1999 | Gics |
| 6,030,442 A | 2/2000 | Kabra et al. |
| 6,143,138 A | 11/2000 | Becker |
| 6,180,288 B1 | 1/2001 | Everhart et al. |
| 6,214,623 B1 | 4/2001 | Simons et al. |
| 6,231,229 B1 | 5/2001 | Halderman |
| 6,244,208 B1 | 6/2001 | Qiu et al. |
| 6,295,167 B1 | 9/2001 | Uematsu et al. |
| 6,399,387 B1 | 6/2002 | Stenholm et al. |
| 6,435,128 B2 | 8/2002 | Qiu et al. |
| 6,472,214 B2 | 10/2002 | Patel |
| 6,570,053 B2 | 5/2003 | Roe et al. |
| 6,593,588 B1 | 7/2003 | Reimer |
| 6,614,728 B2 | 9/2003 | Spevacek |
| 6,694,913 B2 | 2/2004 | Cooperman |
| 6,741,523 B1 | 5/2004 | Bommarito et al. |
| 6,773,637 B1 | 8/2004 | DiSalvo et al. |
| 6,782,909 B1 | 8/2004 | Ragless |
| 6,863,437 B2 | 3/2005 | Ohnishi et al. |
| 6,863,859 B2 | 3/2005 | Levy |
| 6,916,116 B2 | 7/2005 | Diekmann et al. |
| 6,968,804 B1 | 11/2005 | Barbieri et al. |
| 7,232,253 B2 | 6/2007 | Isbitsky et al. |
| 7,313,917 B2 | 1/2008 | Yeghiazarian et al. |
| 7,314,584 B2 | 1/2008 | Tsutsui et al. |
| 7,343,872 B2 | 3/2008 | Taylor et al. |
| 7,435,479 B2 | 10/2008 | Tsutsui et al. |
| 7,571,695 B2 | 8/2009 | Taylor et al. |
| 7,624,698 B2 | 12/2009 | Taylor et al. |
| 7,940,605 B2 | 5/2011 | Ambrozy et al. |
| 8,077,553 B2 | 12/2011 | Braunberger |
| 8,619,507 B2 * | 12/2013 | Ambrozy et al. ............ 368/327 |
| 2002/0031841 A1 | 3/2002 | Asher et al. |
| 2002/0068019 A1 | 6/2002 | Fujiwara et al. |
| 2003/0053377 A1 | 3/2003 | Spevacek |
| 2003/0207466 A1 | 11/2003 | Lee |
| 2004/0120384 A1 | 6/2004 | Shahinpoor |
| 2004/0171740 A1 | 9/2004 | Ruberti et al. |
| 2006/0262828 A1 | 11/2006 | Ambrozy et al. |
| 2007/0036038 A1 | 2/2007 | Ambrozy et al. |
| 2007/0195652 A1 | 8/2007 | Ambrozy et al. |
| 2008/0295761 A1 | 12/2008 | Ambrozy et al. |

FOREIGN PATENT DOCUMENTS

| | | |
|---|---|---|
| JP | 2004301529 A | 10/2004 |
| JP | 2004301530 A | 10/2004 |
| JP | 2005003616 A | 1/2005 |
| WO | WO-87/02163 | 4/1987 |
| WO | WO 92/02005 | 2/1992 |
| WO | WO-01/29525 A1 | 4/2001 |
| WO | WO 2004/062699 | 7/2004 |

OTHER PUBLICATIONS

Vitsab® The sign of freshness. *Time Temperature Indicator Tags—The Key to Consumer Involvement in Food Safety and Quality*. Telatemp. Vitsab Indicator marketing information. 1997. Accessed: Jan. 15, 1998.

*Vitsab® TTI Frequent Asked Questions*. Telatemp. Vitsab Indicator marketing information. 1997. Accessed: Oct. 17, 1998.

*TTI Indicators—The Time Has Come*. Telatemp. Vistab Indicator marketing information. 1997. Accessed: Oct. 17, 1998.

*Vitsab® Freeze Temperature Checkers*. Vitsab Indicator marketing information. Telatemp. 1997, Accessed: Oct. 17, 1998.

*Temperature Labels*. Telatemp. Telatemp marketing information. 1993, Accessed: Oct. 17, 1998.

LifreLines Indicator Marketing information. LifeLines Technology. Oct. 17, 1998.

*Hallcrest: Leading the Way in Temperature-Indicating Technology*. Hallcrest, Inc. Hallcrest Indicator Marketing information. 1997. Accessed: Oct. 17, 1998.

*3M Monitor Mark: High Temperature and Customer Activated Threshold Indicators*. 3M. 3M Indicator Marketing information. 1997. Accessed: Oct. 17, 1998.

*Tempil Temperature Indicators*. Tempil, Inc. Tempil Indicator Marketing information. 1996.

*Measure-Tech Australia: Innovations in Measuring Technology*. Measure-Tech Indicator Marketing information. Measure-Tech Australia Pty Ltd. 1997. Accessed: Oct. 17, 1998.

TempTales3®. Sensitech, Inc. TempTales Indicator Marketing information. 1996-1997. Accessed: Oct. 17, 1998.

*IceWatch*. IceWatch Indicator Marketing information. Timeticket. 1997. Oct. 17, 1998.

Marianne E. Harmon, Mary Tang, Curtis W. Frank; A Microfludic Actuator Based on Thermoresponsive Hydrogels; Polymer; vol. 44 (2003) 4547-4556; Elsevier Science Inc.; USA.

Stevin H. Gehrke, Julie Robeson; James Fred Johnson, and Nitin Vaid; Protein Isolation by Solution-Controlled Gel Sorption; Biotechnol. Prog.; vol. 7; No. 4 (1991); 355-358; American Chemical Society and American institute of Chemical Engineers; USA.

Bhagwati G. Kabra, Stevin H. Gehrke, and Richard J. Spontak; Microporous, Responsive Hydroxypropyl Cellulose Gels 1. Synthesis and Microstructure; Macromolecules; vol. 31; No. 7; (1998); 2166-2173; American Chemical Society; USA.

Seiji Katayama; Chemical Condition Responsible for Thermoswelling or Thermoshrinking Type of Volume Phase Transition in Gels—Effect of Relative Amounts of Hydrophobic to Hydrophilic Groups in the Side Chain; Journal Physical Chemistry; vol. 96; No. 13 (1992); 5209-5210; American Chemical Society; USA.

M.R. Guilherme, R. Silva, E.M. Girotto, A.F. Rubira, E.C. Muniz; Hydrogels Based on PAAm Network With PNIPAAm Included: Hydrophilic—Hydrophobic Transition Measured by the Partition of Orange II and Methylene Blue in Water; Polymer; 44 (2003); 4213-4219; Elsevier Science Ltd.

(56) References Cited

OTHER PUBLICATIONS

Tae Gwan Park, Allan S. Hoffman; Sodium Chloride-Induced Phase Transition in Nonionic Poly(N-isopropylacrylamide) Gel; Macromolecules vol. 26; No. 19; (1993); 5045-5048; American Chemical Society; USA.

Yoshitsugu Hirokawa and Toyoichi Tanaka; Volume Phase Transition in a Nonionic Gel; Journal Chemical Physics; vol. 81, No. 12, Pt. 11; (1984); 6379-6380; American Institute of Physics; USA.

Toyoichi Tanaka; Gels; Scientific American; vol. 244; No. 1; (1981); pp. 124-138; USA.

Shunsuke Hirotsu, Yoshitsugu Hirokawa, and Toyoichi Tanaka; Volume-Phase Transitions of Ionized N-isopropylacrylamide Gels; Journal of Chemical Physics; vol. 87, No. 2 (1987); 1392-1395; The American Institute of Physics; USA.

Akira Mamda, Toyoichi Tanaka, Dawan Kungwatchakun, and Masahiro Irie; Photoinduced Phase Transition of Gels; Macromolecules; vol. 23; No. 5 (1990); 1517-1519; American Chemical Society; USA.

Etsuo Kokufuta and Toyoichi Tanaka; Biochemically Controlled Thermal Phase Transition Gels; Macromolecules; vol. 24; No. 7 (1991); 1605-1607; American Chemical Society; USA.

Yanhie Zhang, Steven Furyk, David E. Bergbreiter and Paul S. Cremer; Specific Ion Effects on the Water Solubility of Macromolecules: PNIPPAm and Hofmeister Series; Journal of the American Chemical Society; vol. 127; No. 41; (2005); pp. 14505-14510; USA.

Franck Ilmain, Toyoichi Tanaka & Etsuo Kokufuta; Volume Transition in a Gel Driven by Hydrogen Bonding; Nature; vol.349; (Jan. 1991); 400-401; USA.

Toyoichi Tanaka, David Fillmore, Shao-Tang Sun, Izumi Nishio, Gerald Swislow and Arati Shah; Phase Transitions in Ionic Gels; Physical Review Letters; vol. 45, No. 20; (1980); 1636-1639; The American Physical Society; USA.

Toyoichi Tanaka, David J. Filmore; Kinetics of Swelling of Gels; Journal of Chemical Physics; vol. 70; No. 3; (1979); pp. 1214-1218; American Institute of Physics; USA.

PCT/US06/16521 International Search Report, Jan. 30, 2007.

PCT/US06/39874 International Search Report, Sep. 13, 2007.

Abandoned U.S. Appl. No. 08/636,133; filed Apr. 22, 1996; first named inventor was Litcher (application not included).

Notice of References Cited for U.S. Appl. No. 08/636,133 dated Jun. 16, 1997.

Notice of References Cited for U.S. Appl. No. 08/636,133 dated Aug. 22, 1999.

Information Disclosure Statement for U.S. Appl. No. 08/636,133 dated Aug. 2, 1999.

Office Action for U.S. Appl. No. 11/486,969—Mailed Apr. 5, 2007.

Oct. 5, 2007 Reply to Office Action for U.S. Appl. No. 11/486,969.

PCT/US06/27564 International Search Report, Apr. 27, 2007.

PCT International Search Report for International Application No. PCT/US06/39874 mailed Sep. 13, 2007.

PCT/US07/87080 International Search Report Jun. 26, 2008.

PCT/US08/55880 International Search Report Aug. 29, 2008.

Office Action for U.S. Appl. No. 11/954,520 (Mailed Dec. 30, 2009).

Reply to OA for U.S. Appl. No. 11/954,520 (Mailed Jun. 30, 2010).

Office Action for U.S. Appl. No. 11/580,241 (Mailed Mar. 5, 2008).

Reply to OA for U.S. Appl. No. 11/580,241 (Mailed Sep. 4, 2008).

Office Action for U.S. Appl. No. 11/580,241 (Mailed Nov. 19, 2009).

Reply to OA for U.S. Appl. No. 11/580,241 (Mailed Apr. 19, 2010).

Declaration of Bruce Hounsell, submitted in U.S. Appl. No. 11/486,969 (Mailed Jun. 20, 2008).

* cited by examiner

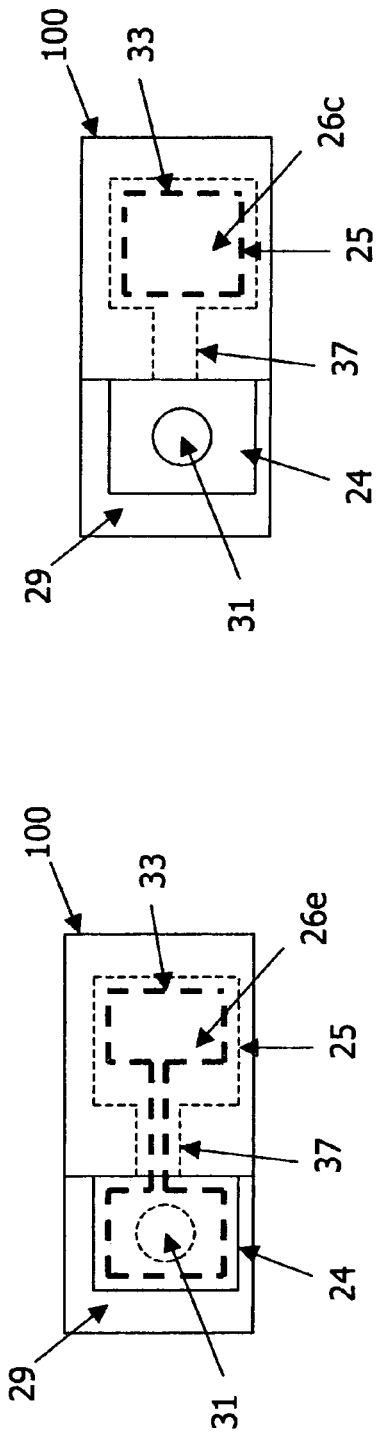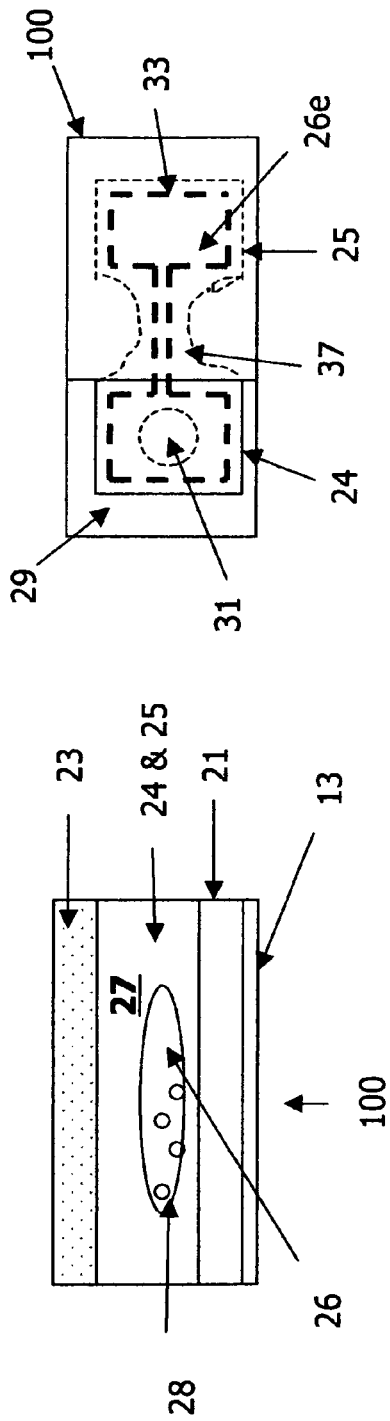

STIMULUS INDICATION EMPLOYING POLYMER GELS

This U.S. Utility Patent Application claims priority to U.S. Provisional Patent Application Ser. No. 60/675,882, filed Apr. 29, 2005, the content of which is hereby incorporated by reference in its entirety into this disclosure.

BACKGROUND OF THE INVENTION

1. Field of the Invention

The present invention relates to stimulus-indicating techniques. More particularly, the present invention relates to devices, methods and kits for indicating when a product has been exposed to a given stimulus for a certain period of time.

2. Background of the Invention

It has long been recognized that the useful life of a perishable product is a function of its cumulative exposure to a harmful stimulus over a period of time. The types of stimuli that advance the degradation of stimulus-sensitive products over time include not only temperature, but also light, pH, humidity, electromagnetic radiation and radiation, to name a few. For example, the useful life of a temperature sensitive product is a function of its cumulative time-temperature exposure a combination of the temperature to which a product is exposed and the duration of the exposure.

For stimulus sensitive products, degradation generally occurs more rapidly at higher magnitudes of the stimulus (e.g., higher temperatures) than at lower magnitudes of the stimulus (e.g., lower temperatures). For example, often a temperature-perishable product will have a longer useful life if it is exposed to lower temperatures than if it is exposed to higher temperatures. However, the converse is also true, in that certain stimulus sensitive products will degrade more rapidly at a lower magnitude of stimulus (especially freezing temperatures) than at a higher magnitude of stimulus. For example, a malaria vaccine will degrade faster below 2° C. than if stored at 3° C.-7° C. Thus the rate of degradation is often stimulus and product specific.

Stimulus perishable products susceptible to degradation due to cumulative time-stimulus exposure include, but are not limited to, food, food additives, chemicals, biological materials, drugs, cosmetics, photographic supplies and vaccines, to name a few. Many manufacturers mark their products with printed expiration dates in an attempt to provide an indication of when the useful life of a perishable product lapses. However, these dates are only estimates and may be unreliable because they are based on assumptions about the stimulus history of the product that may not be true with respect to the particular unit or product within the package on which the expiration date appears.

Specifically, manufacturers compute expiration dates by assuming that the product will be kept within a specified stimulus range during the product's useful life. However, although the manufacturer may have certain control over the environmental conditions of the product while the product is in its possession, it cannot always predict or control the stimulus exposure of a product through each step of the supply chain that delivers the product from its possession to the consumer. If the product is actually exposed to stimuli greater in magnitude than those on which the expiration date is based, the perishable product may degrade or spoil well before the printed expiration date. When this happens, the expiration date may mislead the consumer into believing that the perishable product is still usable when, in fact, its useful life has lapsed. Such false belief of the usefulness/effectiveness of such a product could lead to medical harm, injury or death for a consumer.

Despite its limitations, marking a stimulus sensitive product with an expiration date is useful, nonetheless, because often a visual inspection of the perishable product does not warn a potential user that the exposure of the product to a harmful stimulus has caused it to degrade or spoil. Although there are certain time-stimulus indicators currently available, most are focused on temperature, and not on the other types of stimuli. Additionally, these time-temperature indicators require active agents to be kept separate from one another until the indicator is attached to the product it is monitoring. If the active ingredients are not kept separate they will begin to interact prematurely, thereby giving a premature indication of spoilage. As a result, these types of indicators require manual activation. However, manual activation is not always feasible, cost-effective or efficient when the indicator is being used with a product that is mass-produced in high-volume.

Thus, there is a need for a stimulus magnitude indicator that indicates when a stimulus sensitive product has been exposed to a deleterious stimulus extreme for a pre-determined amount of time. There is also a need for a time-stimulus indicator that does not contain active agents that will begin to interact prior to being attached to the product being monitored, thereby resulting in false indications of product expiration. Furthermore, there is a need for a stimulus indicator that does not require manual activation, and a stimulus indicator that can indicate exposure to two or more temperature magnitudes in a single device.

SUMMARY OF THE INVENTION

The present invention is directed to stimulus sensitive devices and methods, which substantially overcome one or more of the above-mentioned limitations and disadvantages of the related art. Using the exemplary embodiments of the present invention, products having limited useable shelf lives may be better assessed in terms of effectiveness based on the individual package's history of exposure to potentially deleterious levels of harmful external stimulus. Thus, each particular package is individually considered in terms of effectiveness and usefulness based on the history of the package's exposure to various stimuli. Such external stimuli can include, but is not limited to, temperature, heat, light, oxygen, or some combination thereof. Such indication according to the present invention could be used in lieu of or in addition to conventional methods of the indication of an "expiration date" on a given product on the packaging of such product.

To achieve these and other advantages and in accordance with the purposes of the invention, as embodied and broadly described, one exemplary embodiment of the invention is a device that indicates when a stimulus sensitive product may have potentially or conclusively undergone a physical change in response to exposure to a predetermined stimulus extreme.

In accordance with the purposes of the invention, as embodied and broadly described, another exemplary embodiment of the invention is a device that indicates when a stimulus sensitive product has potentially or conclusively undergone a physical change in response to exposure to a predetermined stimulus extreme over a predetermined period of time.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of preferred embodiments of the invention with reference to the drawings, in which:

FIG. 1A is a top view of a stimulus-indicating device according to an exemplary embodiment of the present invention with two compartments and the stimulus-indicating gel in the expanded non-stimulated state.

FIG. 1B is a top view of a stimulus-indicating device according to an exemplary embodiment of the present invention with two compartments and the stimulus-indicating gel in the contracted stimulated state.

FIG. 1C is a side cross-sectional view of the embodiment shown in FIG. 1A.

FIG. 1D is a top view of a stimulus-indicating device according to another exemplary embodiment of the present invention with two compartments and the stimulus-indicating gel in the expanded non-stimulated state.

DETAILED DESCRIPTION OF THE INVENTION

Figure 2A:
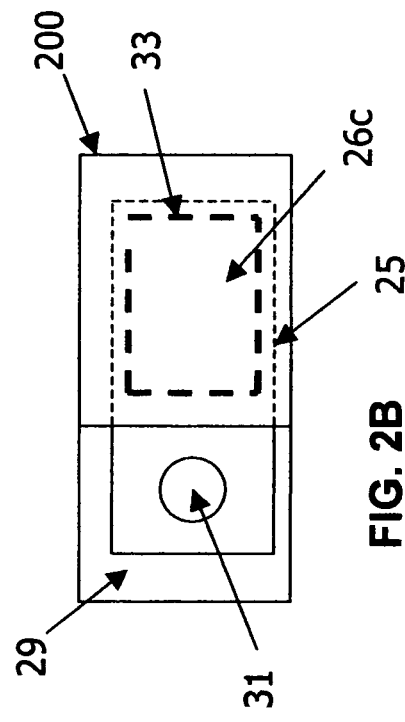
FIG. 2A is a top view of the stimulus-indicating device according to an exemplary embodiment of the present invention with a single compartment and the stimulus-indicating gel in the expanded non-stimulated state.

The present invention provides a more accurate, more specific and more reliable technique for indicating the exposure history of a given product to levels of stimuli that could potentially accumulate to render the product ineffective, unreliable or even harmful. Each product packaging could be individually tagged with such an indicating device according to the present invention and individually assessed in terms of product usefulness. For example, two given pharmaceutical packages from the same manufacturing lot may have been exposed to different levels of temperatures according to the individual life histories of each package. If one package was inadvertently left out of a refrigerated compartment for a few hours, thereby rendering that product ineffective or unreliable, there would be no way for the product end-user to know of such change in the product because the conventional assumption is that the expiration date pre-printed on the product is the indicator of the product's usefulness. Thus, the use of that product can be unproductive, ineffective or even harmful, without the knowledge of the product end-user. The present invention addresses such circumstances and provides product end-users with more specific and more accurate assessment of each given product's potential effectiveness.

Referring now to the drawings, and more specifically to the embodiment of FIGS. 1A and 1B, a top-down view of a stimulus-indicating device 100 according to an exemplary embodiment of the present invention is shown. This embodiment of the stimulus sensitive device 100 includes a first compartment 24 and a second compartment 25. The first compartment 24 and the second compartment 25 are formed by the backing layer 21 on the bottom of the device 100 and an upper layer 23 on the top as shown in FIG. 1C. The first compartment 24 and the second compartment 25 are additionally formed and differentiated from one another by a constricting region or neck portion 37. Thus, the first compartment 24 and the second compartment 25 could be formed in the shape of an hour-glass wherein the two compartments are connected by the constricting region or neck portion 37, as shown in FIG. 1D, or the shape of two squares or rectangles connected by the constricting region or neck portion 37 formed as a channel as shown in FIG. 1A. Other shapes are contemplated within the scope of the invention. A suitable liquid 27 as taught, for example, by the references incorporated herein, interacts with the gel 26 and can flow freely between the first compartment 24 and the second compartment 25 through the neck portion 37, while the neck portion 37 provides a constricting region.

Both the backing layer 21 and the upper layer 23 may be constructed of a strong, resilient leak-proof material, such as plastic or other polymer material, so as to provide for the twisting or bending that might occur during transportation of the temperature sensitive product without tearing, breaking or leaking. The backing layer 21 and the upper layer 23 may also be made of a material that preferably allows them to be joined and sealed together, such as by heat stamping or other suitable means. The backing layer 21 and the upper layer 23 can both approximate the length and width of the first compartment 24 and second compartment 25 combined, although variations in these dimensions are within the scope of the present invention. The upper layer 23 can preferably be made of a clear material, such as plastic, so that the user of the device 100 can view at least some portion of the backing material 21. The upper layer 23 can also be able to accept paint or ink so as to allow for coloring or concealing at least some portion of the first or second compartments 24 and 25.

Although some portion of the upper layer 23 can also accept paint or ink for coloring, it is preferable that the display portion 29 of the upper layer 23 remain free from ink or coloring so that the user of the device 100 can observe the first compartment 24 through the display portion 29 as explained below. The backing layer 21 should also be able to accept paste, glue or other suitable adhesive 13 on the surface not facing the first compartment 24 and second compartment 25.

In this exemplary embodiment, the indicator spot 31 located on the surface of the backing layer 21 (see also FIG. 1B) that is contained in the first compartment 24 is colored a first color, such as, for example, red. One of ordinary skill in the art will realize that while shown as a circular spot 31 in FIGS. 1A and 1B, the indicator spot 31 could be a symbol (e.g., an "X") or a word or numeric designation (e.g., "OK", "Hot", "Cold" or "2° C."). Moreover, the gel 26 can be manufactured so that it is dyed with a colorant so that it possess a second color which is preferably visibly distinct from the first color located on the backing layer 21. Alternatively, the gel 26 can be manufactured so that it is opaque in its unstimulated state. The gel 26 can also be designed and manufactured so that in its unstimulated-expanded state it contains a particle or metal colorant 28 that binds to the gel 26. When the gel 26 contains a certain concentration of that particle or metal colorant 28, the gel 26 takes on a color. For example, if the metal colorant 28 contained inside the gel 26 were copper, the gel 26 would take on a blue color. Other particle/metal and color combinations are also possible and within the purview of one of ordinary skill in the art after consideration of the present disclosure. One of ordinary skill in the art will also understand that the indicator spot 31 and the gel 26 do not necessarily need to be different colors. Instead the indicator spot 31 and the gel 26 can be the same color, so long as the gel 26 interacts with the indicator spot 31 so as to indicate to a viewer that a stimulus extreme has impacted the stimulus sensitive product to which the indicator 100 is attached.

As shown in FIG. 1A and FIG. 1D, when the gel 26 in this embodiment has not been exposed to a stimulus extreme, such as temperature, the gel 26 is in its expanded state (contour shown by heavy dashed-lines 26e) and lies in both the first compartment 24 and the second compartment 25. Thus, prior to being exposed to a critical temperature extreme, the gel 26e completely covers the indicator spot 31 located on the backing layer 21 and positioned inside the first compartment 24. The gel 26 that is in its expanded state 26e is present in both the first compartment 24 and the second compartment 25 and is designed to be sensitive to a stimulus, and reacts to such stimulus by undergoing a noticeable decrease in volume. In other words, when the gel 26e is exposed to a predetermined stimulus, the liquid within the polymer network that gives the gel 26e its volume would be expelled. As the liquid is expelled, the gel 26e contracts and/or shrinks in size, resulting in a contracting and/or shrinking of the size and/or volume of the gel, to result in the shape as shown by the gel 26c in FIG. 1B. The contracting and/or shrinking in size and/or volume of the gel 26 in this embodiment can be by any amount so long as it is noticeable and reveals, even partially, the indicator spot 31. Preferably the contracting and/or shrinking in size and/or volume of the gel 26e in this embodiment is between at least a $1/10$ contracting and/or shrinking in original size and/or volume, and preferably up to 500 times contracting and/or shrinking in original size and/or volume.

The type of gel used will determine the magnitude of decrease in size and/or volume that could be potentially experienced by the gel 26 within the device. For simplicity of discussion, it is understood that all references to expansion or contraction of the gels, as described herein, refer to changes in cross-sectional size and/or volume changes, even if not specifically identified as such.

Any of a number of different gels may be used in the exemplary embodiments shown herein and throughout this disclosure. Such gels can be any gel that produces a physical change in structure in response to a given physical stimulus. Such physical stimulus, as described above, may include, but is not limited to, temperature, light, humidity, electromagnetic radiation and radiation, pH, oxygen levels, $CO_2$, CO, $H_2O$, or any other type of stimulus that could be a source of potential damage, ineffectiveness, inertness or deterioration for a given product, device or composition.

By way of example only, a gel 26 (or other visual change agent) which changes in size and/or volume when it is exposed to a predetermined stimulus can be used with the present invention. Examples of such gels include, but are not limited to, those described in U.S. Pat. Nos. RE35,068, 5,403, 893 and 4,732,930 to Tanaka et al. See also, Harmon et al., "A microfluidic actuator based on thermoresponsive hydrogels", Polymer 44 (2003) at 4547-4556. These references are incorporated by reference herein in their entirety. Other gels may also be used. For sake of simplicity, reference will be made to the particular gels disclosed in the above cited and incorporated references. By manufacturing the gel 26 in the manner described in any of these references, the gel 26 will remain stable at its manufactured size and/or volume and color concentration until it is exposed to the predetermined stimulus. As disclosed in these references, the gel 26 is designed to work in conjunction with any suitable liquid 27 (for example, water) that aids in its decrease in size and/or volume change.

In this embodiment the first compartment 24 and the second compartment 25 are interconnected so that the liquid 27 flows freely between the first compartment 24 and the second compartment 25, and bathes the gel 26 in both its expanded unstimulated state (see FIGS. 1A and 1D) as well as its contracted stimulated state (see FIG. 1B) as described in further detail below.

These references also disclose a method to design the gel 26 so that it decreases in size and/or volume once the gel 26 is exposed to the predetermined stimulus. For example, the gel 26 in this embodiment can be designed so that it is stable so long as it stays above 20° C. However, once the gel is exposed to temperature less that 2° C., the gel 26 will begin to undergo its phase transition, resulting in the liquid 27 being expelled from the polymer network of the gel 26. And as the liquid 27 is expelled, the gel 26 will contract and/or shrink in size and/or volume, resulting in the gel 26 withdrawing from the first compartment 24, thereby revealing the indicator spot 31. The converse is also possible, with the use of gels that are stable as long as the temperature is above a certain level, such as, for example, gels that are stable as long as they are below 20° C. Other magnitude and sensitivities of the gel are also possible and within the scope of the present invention.

As shown in FIG. 1B, once the gel 26 has been exposed to the predetermined stimulus extreme for a predetermined amount of time, the gel 26 will collapse (the contour of which is shown by heavy dashed-lines 26c) to a point where the second color of the gel 26 is no longer visible because it has receded from the display portion 29 in the upper layer 23, positioned above the first compartment 24. At this point the first color (e.g., red) of the indicator spot 31 located on the backing material 21 in the first compartment 24 is fully visible to the user through the display portion 29 located in the upper layer 23. It is the appearance of this first color in the indicator spot 31 that indicates to the user that the stimulus sensitive product to which the stimulus-indicating device 100 is attached, has been exposed to a deleterious stimulus extreme, and has either probably or definitely expired or lost effectiveness.

As the gel 26 is contracting and/or shrinking in size and/or volume, and hence retracting into the second compartment 25, portions of the indicator spot 31 become revealed, thereby indicating the gradual ineffectiveness of the product to which device 100 is attached. In other words, if about half of the indicator spot 31 is exposed, then the product has been exposed to about half the deleterious levels of external stimuli that would render it ineffective. The time period needed to expose part or all of the indicator spot 31 is dependent on the product itself and would have to be calibrated accordingly with respect to each product. Indicator spot 31 size and shape is part of such calibration and would depend in large part to the particular gel 26 being used. Further, the gel 26 and device 100 used according to the present invention may be designed to indicate the exposure to a stimulus extreme or the time duration to a stimulus that may accumulate to render the product ineffective. For example, the device according to the present invention may indicate when the product has been exposed to a temperature of 40° C. for over 30 seconds, or it may indicate the total cumulative effect of exposure to temperatures above 10° C., or both (see FIG. 3). A one time exposure (former case) and a cumulative effect (latter case) could either be a source of ineffectiveness for a product and the present invention could account for either or both scenarios.

In one exemplary embodiment, the gel 26 could be free-form or pliable enough so that it can withdraw from the first compartment 24 through the neck portion 37 as the liquid 27 is expelled and the gel 26 contracts and/or shrinks in size and/or volume. In the preferred embodiment the gel 26 would be attached at the attachment point 33 in the second compartment 25 to ensure that the gel 26 reveals the indicator spot 31 as the volume collapses. The attachment point 33 is made to either the upper layer 21, the backing layer 23 or both, at one end of the first compartment 25. Alternatively, rather than having the gel and liquid in a free-flowing state, the gel 26 may be pre-formed in a desired shape, matching the expanded shape 26e. Thereafter, when exposed to the desired stimulus, and the gel 26 collapses into its smaller volume, it will not obscure the indicator spot 31.

An exemplary gel 26 as used in the present invention may be reversible, meaning it reverts back to its original volume when the stimulus is removed. Thus, the embodiments described herein may include reversible and irreversible gels. It is helpful for this embodiment that the size and/or volume change that the gel 26 undergoes be irreversible. Therefore, when the stimulus is removed the gel 26 would not revert back to its original larger volume, since doing so would cover up the first color of the indicator spot 31 again, and thus falsely indicate that the stimulus sensitive product to which the device 100 is attached had not been exposed to a deleterious stimulus level. More preferably, the gel 26 must remain at its smaller volume so that the second color of the gel 26 is hidden under the upper layer 23, and the indicator spot 31 is permanently visible to the user. For example, when the exemplary gel 26 heats back up to its non-critical temperature extreme, such as greater than or equal to 2° C., it should not revert back to its original larger volume, since doing so would cover up the first color of the indicator spot 31, and thus falsely indicate that the stimulus sensitive product, such as a malaria vaccine vial to which the device 100 is attached, had not been exposed to a deleterious stimulus extreme. Instead the gel 26 must remain at its smaller volume so that the second color of the gel 26 is hidden under the upper layer 23, and the indicator spot 31 is permanently visible to the user.

Even if the gels utilized in this invention are reversible (they revert back to their original shape upon removal of the stimulus), the compartment shapes 24 and 25 and/or the constricting region or neck portion 37 will restrict the flow of the gel 26, so that the majority of the reversible gel remains in the second compartment 25, even after the stimulus threshold is removed.

More specifically, once the gel 26 has migrated completely out of the first compartment 24 as shown in FIG. 1B, the constricting region or neck portion 37 prevents the gel 26c, which is totally gathered in the second compartment 25, from moving back into the first compartment 24, even after the stimulus extreme had been removed and the gel 26 expanded back to its original size and/or volume. In this exemplary embodiment the stimulus indicating device 100 is irreversible because the revealed indicator spot 31 can not be covered back up by the gel 26c because the gel 26c cannot reenter the first compartment 24 due to the constricting region or neck portion 37, which prevents the movement of the gel 26c out of the second compartment 25. Even if the deleterious stimulus extreme is removed and the gel 26 returns to its expanded state in the second compartment 25, the gel 26 will not move back into the first compartment 24. It will be understood that a similar embodiment is applicable to a situation where the deleterious temperature extreme only partially affects the gel 26, thereby resulting in the gel 26 only partially contracting and/or shrinking in size and/or volume. This partial contraction of the gel 26 will result in the indicator spot 31 being only partially revealed. However, this partial uncovering of the indicator spot 31 will be permanent because the constricting region or neck region 37 prevents the gel 26 from expanding once the deleterious temperature extreme is removed. One of ordinary skill will recognize that if the device 100 is subjected to additional exposure to deleterious stimulus extremes, the liquid 27 will continue to be expelled from the gel 26, which will result in the gel 26 further contracting and/or shrinking in size and/or volume. Moreover, the additional uncovering of the indicator spot 31 will also be permanent because of the constricting region or neck portion 37.

As known with respect to some of the conventional gels described in the references cited above and incorporated herein, such as that disclosed in U.S. Pat. No. 6,030,442 to Kabra et al., the rate at which the gel 26 contracts can be manipulated by varying the size of the beads that comprise the gel 26. This is because their volume change is controlled by the rate of heat transfer through the gel. As one of ordinary skill would appreciate, the smaller the bead size of the gel 26, the faster the gel 26 will undergo its contraction and/or shrink in size and/or volume. Conversely, the larger the bead size of the gel 26, the longer it will take the gel 26 to undergo its phase transition, and consequently its contraction and/or shrinking in size and/or volume; as well as its converse expansion and/or increase in size and/or volume.

Figure 2B:
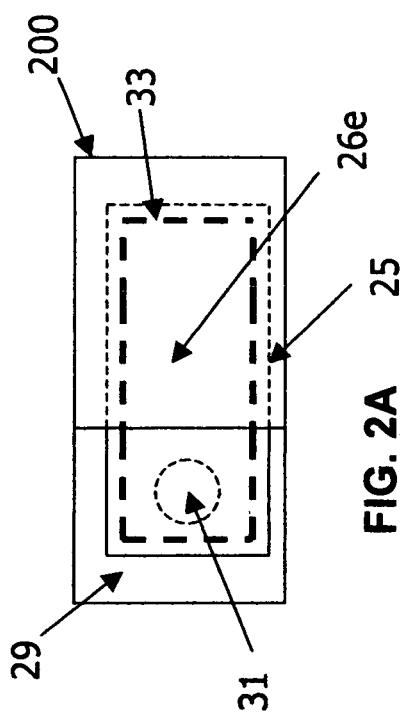
FIG. 2B is a top view of the stimulus-indicating device according to an exemplary embodiment of the present invention with a single compartment and the stimulus-indicating gel in the contracted stimulated state.

Referring now to the exemplary embodiment of FIGS. 2A and 2B, another stimulus-indicating device 200 is shown according to the present invention. In this embodiment the device 200 has only one compartment 25, and the gel 26 is preferably manufactured in the shape of a sheet or layer. In this embodiment the sheet or layer of gel 26 is preferably attached at attachment point 33 to either the upper layer 21, the backing layer 23 or both, at one end of the first compartment 25. More preferably the gel 26 is attached to either the upper layer 21, the backing material 23, or both at the attachment point 33 at the end of the gel 26 that is opposite from the indicator spot 31 as shown in FIG. 2A and FIG. 2B. By attaching the gel 26 to the attachment point 33, the gel 26 colored a second color is ensured to contract and/or shrink in size and/or volume away from and reveal the first color of the indicator spot 31 through the display portion 29 in the upper layer 23 when the gel 26 reaches the pre-determined stimulus extreme. For example, when the gel 26 in FIG. 2A is at its non-deleterious stimulus extreme, such as 2° C. or warmer, or 9° C. or colder, the gel 26 is in its expanded state (26e) and covers the indicator spot 31. However, when the gel 26 is exposed for the pre-determined period of time to a stimulus extreme that will cause the gel 26 to collapse, such as colder than 2° C. (or warmer than 9° C.) for longer than 1 hour, as shown in FIG. 2B, the decrease in volume (26c) will reveal the indicator spot 31, thus indicating that the stimulus sensitive product to which the device 100 is attached has probably or definitely been rendered ineffective because of exposure to a deleterious temperature extreme. Because the gel 26 is preferably fixed to the attachment point 33, it cannot float freely in the first compartment 25 and potentially block the indicator spot 31 from view when in its contracted state.

It should also be understood that if a different type of gel 26 is used in the device 100, another embodiment is possible where the same function of the device 100 can still be achieved (i.e., indicate exposure to a deleterious temperature extreme), but in reverse. In other words, rather than the process proceeding from an expanded gel state 26e to a contracted gel state 26c as shown in the sequence of FIGS. 1A to 1B, the process would be reversed. The process would proceed from a contracted gel state 26c to an expanded gel state 26e as shown in the sequence of FIGS. 1B to 1A.

For example, using gels such as those described herein and herein incorporated references, the gel 26 would be contracted and/or shrunk in size and/or volume (26c) so long as it was not exposed to a pre-determined stimulus extreme, such as less than 2° C. (or greater than 9° C.), and would be present in only the second compartment 25 as shown in FIG. 1B. Preferably, the gel 26c would be attached to the upper layer 21 and lower layer 23 at the attachment point 33. Thus the indicator spot 31 would be visible to the user through the display portion 29 and it would indicate that the temperature sensitive product to which the device 100 was attached had not been harmed by a deleterious stimulus extreme. However, once the stimulus extreme was experienced, such as when the temperature dropped below 2° C. (or climbed above 9° C.), as shown in FIG. 1A, the gel 26e would increase in volume and cover the indicator spot 31 with its second color. Preferably the gel 26e would be manufactured to be permanently expanded (irreversible), and thus it would never recede from the first compartment 24 and would permanently indicate to the user that the stimulus sensitive product to which the device 100 was attached had been exposed and most likely harmed by a deleterious stimulus extreme. This same "reverse" embodiment of contraction to expansion can also be applied to the device 200 described above in regard to FIGS. 2A and 2B.

In FIGS. 1A and 1B, and 2A and 2B, the particular gel 26 either shrank or swelled in response to a cold temperature stimulus. One of ordinary skill in the art would understand that by selecting a particular gel, such as described in the previously cited references, the particular gel 26 could either shrink or swell in response to a hot or warmer temperature stimulus as well.

Figure 2C:
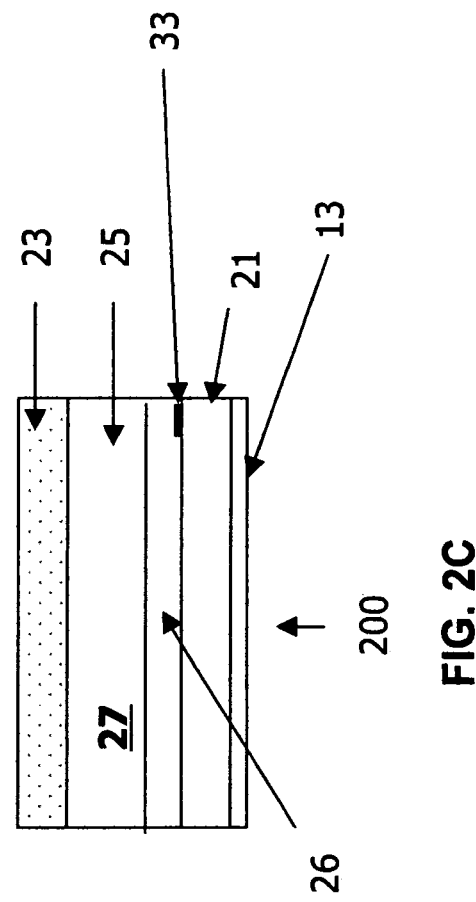
FIG. 2C is a side cross-sectional view of the embodiment shown in FIG. 2A.
Figure 3:
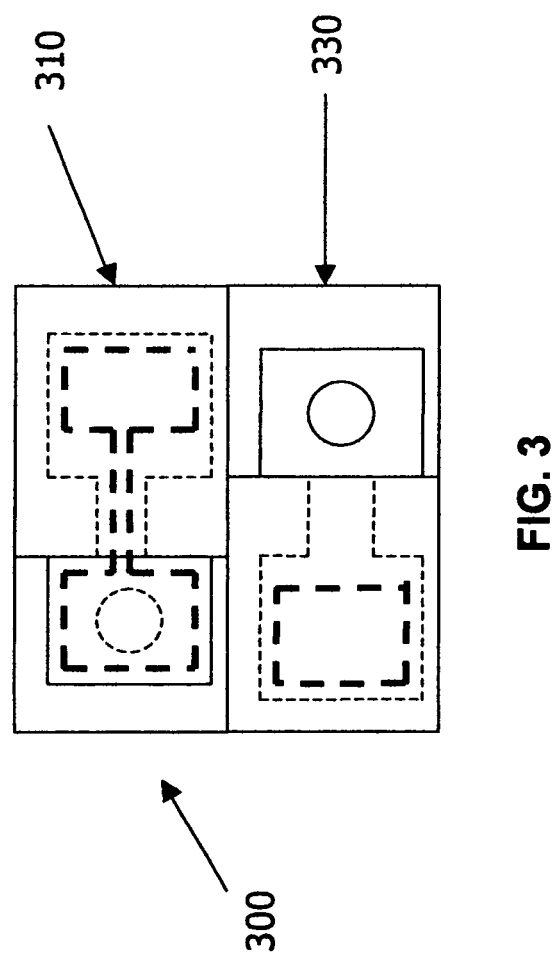
FIG. 3 is a top view of a multiple compartment stimulus-indicating device according to an exemplary embodiment of the present invention for indicating exposure to at least two temperature thresholds.

Another exemplary embodiment of the present invention, as shown in FIG. 3, is the combination of two separate and distinct gels that indicate exposure to two stimulus extremes in the same indicator. Any of the embodiments shown in FIGS. 1 and 2 may be combined to provide such a dual indicator, although preferably one indicator will indicate exposure below a certain temperature threshold, and the other will indicate exposure above a certain temperature threshold. Also, more than two indicators may be combined to provide a visual indication at exposure temperatures above or below more than two thresholds. The two or more indicators can be oriented vertically, horizontally or any other relationship to each other.

For example, as shown in FIG. 3, the device 300 contains a first indicator 310 that operates, for example, as discussed above in regard to FIGS. 1 and 2, in that it indicates exposure to a certain stimulus extreme at one end of the stimulus spectrum (lower end), while the at least second indicator 330 operates as discussed above in regard to a device that indicates exposure to a certain stimulus extreme at the opposite end of the stimulus spectrum (upper end).

By way of example only, the first indicator 310 in device 300 would indicate exposure of the device 300 to a temperature extreme of less than or equal to 1° C. for a predetermined amount of time, and the second indicator 330 in device 300 would indicate exposure of the device 300 to a temperature extreme of greater than or equal to 9° C. for a predetermined amount of time. Thus, the indicator 300 would indicate, via a single indicator, whether or not the stimulus sensitive product to which the indicator 300 is attached had been exposed to a harmful stimulus on both sides of the safe stimulus spectrum. Other combinations are also possible, and may include different combinations of the stimuli discussed herein, for example temperature and pH.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A stimulus indicating device that is capable of permanently indicating exposure to a predetermined stimulus comprising:
   a first compartment;
   a display window positioned above said first compartment;
   an indicator spot located in said first compartment and positioned below said display window;
   a second compartment;
   a stimulus sensitive gel contained in both said first compartment and said second compartment that is capable of contracting from a first volume to a second volume in response to exposure to the predetermined stimulus, and said stimulus sensitive gel having a position in said first compartment relative to said indicator spot such that said stimulus sensitive gel covers and visibly blocks said indicator spot from being viewed through said display window; and
   a constricting neck portion connecting said first compartment with said second compartment that is capable of allowing at least a portion of said stimulus sensitive gel to contract out of said first compartment and into said second compartment when said stimulus sensitive gel shrinks in volume in response to exposure to the predetermined stimulus, and said constricting neck portion is capable of permanently preventing said stimulus sensitive gel that contracted and moved out of said first compartment and into said second compartment from expanding back into said first compartment and recovering said indicator spot regardless of whether the predetermined stimulus is removed.

2. The stimulus indicating device of claim 1,
   wherein said stimulus sensitive gel is capable of contracting in volume in response to exposure to the predetermined stimulus selected from the group consisting of temperature or electromagnetic radiation.

3. The stimulus indicating device of claim 1, further comprising:
   an attachment point attached to said stimulus sensitive gel that is capable of preventing said stimulus sensitive gel from moving freely inside the stimulus indicating device.

4. The stimulus indicating device of claim 1, further comprising:

an attachment point that connects said stimulus sensitive gel to said second compartment and that is capable of preventing said stimulus sensitive gel from moving freely inside the stimulus indicating device.

5. The stimulus indicating device of claim 1,
wherein said stimulus sensitive gel is capable of contracting by only a partial amount so as to reveal only a portion of said indicator spot.

6. The stimulus indicating device of claim 1,
wherein said stimulus sensitive gel is capable of contracting by such an amount that it fully reveals said indicator spot.

7. The stimulus indicating device of claim 3, further comprising:
said stimulus sensitive gel having a position relative to said indicator spot such that at least a portion of said indicator spot is capable of being permanently exposed and visible through said display window when said constricting neck portion permanently prevents said stimulus sensitive gel from expanding back into said first compartment from said second compartment.

8. The stimulus indicating device of claim 4, further comprising:
said stimulus sensitive gel having a position relative to said indicator spot such that at least a portion of said indicator spot is capable of being permanently exposed and visible through said display window when said constricting neck portion permanently prevents said stimulus sensitive gel from expanding back into said first compartment from said second compartment.

9. A stimulus indicating device that is capable of providing a permanent indication of exposure to a predetermined stimulus comprising:
a first compartment;
a second compartment;
a constricting neck portion connecting said first compartment to said second compartment;
a stimulus sensitive gel contained in at least said first compartment and said constricting neck portion, that is capable of contracting from a first volume to a second volume in response to exposure to the predetermined stimulus, and is capable of contracting out of said first compartment and into said second compartment in response to exposure to the predetermined stimulus;
an indicator spot located in said first compartment and having a position in said first compartment relative to said stimulus sensitive gel such that it is positioned below said stimulus sensitive gel so that it is physically covered and visibly blocked by said stimulus sensitive gel prior to exposure of said stimulus sensitive gel to the predetermined stimulus; and
an indicator window positioned above said first compartment and positioned above said stimulus sensitive gel and positioned above said indicator spot,
wherein said constricting neck portion is capable of allowing said stimulus sensitive gel to contract out of said first compartment and into said second compartment when said stimulus sensitive gel shrinks in volume in response to exposure to the predetermined stimulus, and said constricting neck portion is capable of permanently preventing said stimulus sensitive gel that contracted out of said first compartment into said second compartment from expanding back into said first compartment and recovering said indicator spot regardless of whether the predetermined stimulus is removed.

10. The stimulus indicating device of claim 9,
wherein said stimulus sensitive gel is capable of contracting in volume in response to exposure to the predetermined stimulus selected from the group consisting of temperature or electromagnetic radiation.

11. The stimulus indicating device of claim 9, further comprising:
an attachment point attached to said stimulus sensitive gel that is capable of preventing said stimulus sensitive gel from moving freely inside the stimulus indicating device.

12. The stimulus indicating device of claim 9, further comprising:
an attachment point that connects said stimulus sensitive gel to said second compartment and that is capable of preventing said stimulus sensitive gel from moving freely inside the stimulus indicating device.

13. The stimulus indicating device of claim 9,
wherein said stimulus sensitive gel is capable of contracting by only a partial amount so as to reveal only a portion of said indicator spot.

14. The stimulus indicating device of claim 9,
wherein said stimulus sensitive gel is capable of contracting by such an amount that it fully reveals said indicator spot.

15. The stimulus indicating device of claim 11, further comprising:
said stimulus sensitive gel having a position relative to said indicator spot such that at least a portion of said indicator spot is capable of being permanently exposed and visible through said display window when said constricting neck portion permanently prevents said stimulus sensitive gel from expanding back into said first compartment from said second compartment.

16. The stimulus indicating device of claim 12, further comprising:
said stimulus sensitive gel having a position relative to said indicator spot such that at least a portion of said indicator spot is capable of being permanently exposed and visible through said display window when said constricting neck portion permanently prevents said stimulus sensitive gel from expanding back into said first compartment from said second compartment.

17. A stimulus indicating device that is capable of permanently indicating exposure to a predetermined stimulus comprising:
an upper layer;
a backing layer;
a first compartment;
a second compartment;
a constricting neck portion connecting said first compartment and said second compartment;
a display window positioned in said upper layer and located above said first compartment for viewing said first compartment; and
a stimulus sensitive gel that is contained in said first compartment and said second compartment, said stimulus sensitive gel being capable of contracting from a first volume to a second volume in response to exposure to the predetermined stimulus, and said stimulus sensitive gel having a position in said first compartment relative to said portion of said backing layer such that said stimulus sensitive gel covers and visibly blocks said portion of said backing layer from being viewed through said display window;
wherein a portion of said backing layer is positioned inside said first compartment and positioned below said display window and is capable of providing an indication whether said stimulus indicating device had been exposed to the predetermined stimulus; and wherein said constricting neck portion is capable of allowing said stimulus sensitive gel to contract out of said first compartment and into said second compartment when said stimulus sensitive gel shrinks in volume in response to exposure to the predetermined stimulus, and said constricting neck portion is capable of permanently preventing said stimulus sensitive gel that contracted out of said first compartment into said second compartment from expanding back into said first compartment and recovering said portion of said backing layer regardless of whether the predetermined stimulus is removed.

18. The stimulus indicating device of claim 17, wherein said stimulus sensitive gel is capable of contracting in volume in response to exposure to the predetermined stimulus selected from the group consisting of temperature or electromagnetic radiation.

19. The stimulus indicating device of claim 17, further comprising:

an attachment point attached to said stimulus sensitive gel that is capable of preventing said stimulus sensitive gel from moving freely inside the stimulus indicating device.

20. The stimulus indicating device of claim 17, further comprising:

an attachment point that connects said stimulus sensitive gel to said second compartment and that is capable of preventing said stimulus sensitive gel from moving freely inside the stimulus indicating device.

21. The stimulus indicating device of claim 17, wherein said stimulus sensitive gel is capable of contracting by only a partial amount so as to reveal only a part of said portion of said backing layer.

22. The stimulus indicating device of claim 17, wherein said stimulus sensitive gel is capable of contracting by such an amount that it fully reveals said portion of said backing layer.

23. The stimulus indicating device of claim 19, further comprising:

said stimulus sensitive gel having a position relative to said portion of said backing layer such that at least a part of said portion of said backing layer is capable of being permanently exposed and visible through said display window when said constricting neck portion permanently prevents said stimulus sensitive gel from expanding back into said first compartment from said second compartment.

24. The stimulus indicating device of claim 20, further comprising:

said stimulus sensitive gel having a position relative to said portion of said backing layer such that at least a part of said portion of said backing layer is capable of being permanently exposed and visible through said display window when said constricting neck portion permanently prevents said stimulus sensitive gel from expanding back into said first compartment from said second compartment.

* * * * *